(12) United States Patent
Ohzono

(10) Patent No.: US 7,661,857 B2
(45) Date of Patent: *Feb. 16, 2010

(54) VEHICLE LIGHT UNIT WITH SHADOW CASTING FEATURE

(75) Inventor: Gen Ohzono, Iwata (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 312 days.

This patent is subject to a terminal disclaimer.

(21) Appl. No.: 11/690,343

(22) Filed: Mar. 23, 2007

(65) Prior Publication Data
US 2007/0230198 A1 Oct. 4, 2007

(30) Foreign Application Priority Data
Mar. 24, 2006 (JP) .............................. 2006-081941

(51) Int. Cl.
*B62J 6/00* (2006.01)

(52) U.S. Cl. .................. 362/473; 340/432; 362/499; 362/506

(58) Field of Classification Search ................. 362/473, 362/506, 540, 368, 370, 457, 459, 475, 476, 362/483, 487, 541, 546, 548, 549, 497, 498, 362/499; 280/152.05; 340/432
See application file for complete search history.

(56) References Cited

U.S. PATENT DOCUMENTS

| 5,001,610 | A | * | 3/1991 | Otaka ......................... 362/510 |
| 5,707,130 | A | * | 1/1998 | Zwick et al. ................. 362/517 |
| 5,806,957 | A | * | 9/1998 | Prior et al. .................. 362/459 |
| 6,409,371 | B2 | * | 6/2002 | Aikawa ....................... 362/520 |

FOREIGN PATENT DOCUMENTS

JP        10-100968       4/1998

* cited by examiner

*Primary Examiner*—Gunyoung T Lee
(74) *Attorney, Agent, or Firm*—Keating and Bennett, LLP

(57) ABSTRACT

The light unit includes a lens, shadow-forming surface, and a shadow casting surface. Outside light entering the light unit is at least partially blocked by the shadow casting surface so as to cast a shadow on the shadow-forming surface. The shadow casting surface may be embedded within or on a surface of the lens or otherwise supported above the shadow forming surface. The shadow casting design is preferably spaced from the shadow-forming surface.

18 Claims, 9 Drawing Sheets

US 7,661,857 B2

VEHICLE LIGHT UNIT WITH SHADOW CASTING FEATURE

RELATED APPLICATIONS

The present application is based on and claims priority under 35 U.S.C. § 119(a)-(d) to Japanese Patent Application No. 2006-081941, filed on Mar. 24, 2006, the entire contents of which is hereby expressly incorporated by reference herein.

BACKGROUND OF THE INVENTION

1. Field of the Invention

The present invention relates to a light unit for a vehicle.

2. Description of the Related Art

Conventional motorcycles have a tail lamp and lens assembly that is visible from the left and right sides to improve the motorcycle's external appearance (see, for example, Japanese Patent Abstract JP-A-10-100968). In addition, some motorcycles include indicia of the name of the vehicle model or manufacturer. Such indicia often are (but not necessarily limited to) trademarks and/or logos of the manufacturer, and will hereinafter be referred to as a "seal". The seal commonly is a sticker and is preferably placed in a location that is highly visible. The seal may be attached, for example, to an upper surface of the exposed portion of the lens. In this case, the light emitted by the bulb passes through the lens and obscures the visibility of the seal. In order to increase the visibility of the seal, fine lines can be cut in the lens to make it difficult for the light to reach the area where the seal is attached. Unfortunately, the fine lines cut in the lens result in the seal having a plain appearance.

SUMMARY OF THE INVENTION

In view of the foregoing, a need exists for a light unit that has an unconventional and distinct external appearance as compared to conventional light units.

In accordance with one aspect of the present invention, a light unit is provided that includes a translucent lens that has a shadow-forming surface on an inner side of the lens. Light passing through the lens forms a shadow on the shadow-forming surface. To accomplish this visual effect, the light unit includes a shadow casting design that blocks at least some of the light and forms the shadow on the shadow-forming surface. A gap between the shadow casting design and the shadow-forming surface gives the shadow casting design a three-dimensional appearance. When outside light, such as sunlight, travels towards the shadow-forming surface, the light casts a shadow of the shadow casting design on the shadow-forming surface. The shadow casting design gives the viewer the impression that the design is three-dimensional and is floating.

In one preferred embodiment of the light unit, the light unit includes a lens at least partially made from a translucent material and a shadow-forming surface disposed inside the lens. The shadow-forming surface is at least partially made from an opaque material. The light unit further includes a shadow casting design disposed on the lens and spaced from the shadow-forming surface so that outside light entering through the lens casts a shadow on the shadow-forming surface.

Another aspect of the invention is directed to a vehicle comprising a frame supported by two wheels and a light unit. The light unit includes a lens at least partially made from a translucent material and a shadow-forming surface disposed inside the lens. The shadow-forming surface is at least partially made from an opaque material. The light unit further includes a shadow casting design disposed on the lens and spaced from the shadow-forming surface so that outside light entering through the lens casts a shadow on the shadow-forming surface.

An additional aspect of the invention involves a light unit comprising an outer lens and an inner lens. At least a portion of the inner lens is inside the outer lens. The light unit further includes an opaque member disposed inside the inner lens and a shadow casting member. The shadow casting member is disposed between the outer lens and the opaque member. At least a portion of the shadow casting member is spaced from at least a portion of the opaque member so that at least some outside light entering the outer lens casts a shadow on the opaque member. The outer lens preferably has an unconventional and novel external appearance.

The present light unit for a vehicle has several features, no single one of which is solely responsible for its desirable attributes. Without limiting the scope of the invention as expressed by the claims, its more prominent features have been discussed briefly above. After considering this discussion, and particularly after reading the section entitled "Detailed Description of the Preferred Embodiments," one will understand how the features of the present light unit provide several advantages over conventional vehicle light assemblies.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The following are brief descriptions of the drawings.

DETAILED DESCRIPTION OF THE PREFERRED EMBODIMENTS

Figure 1:
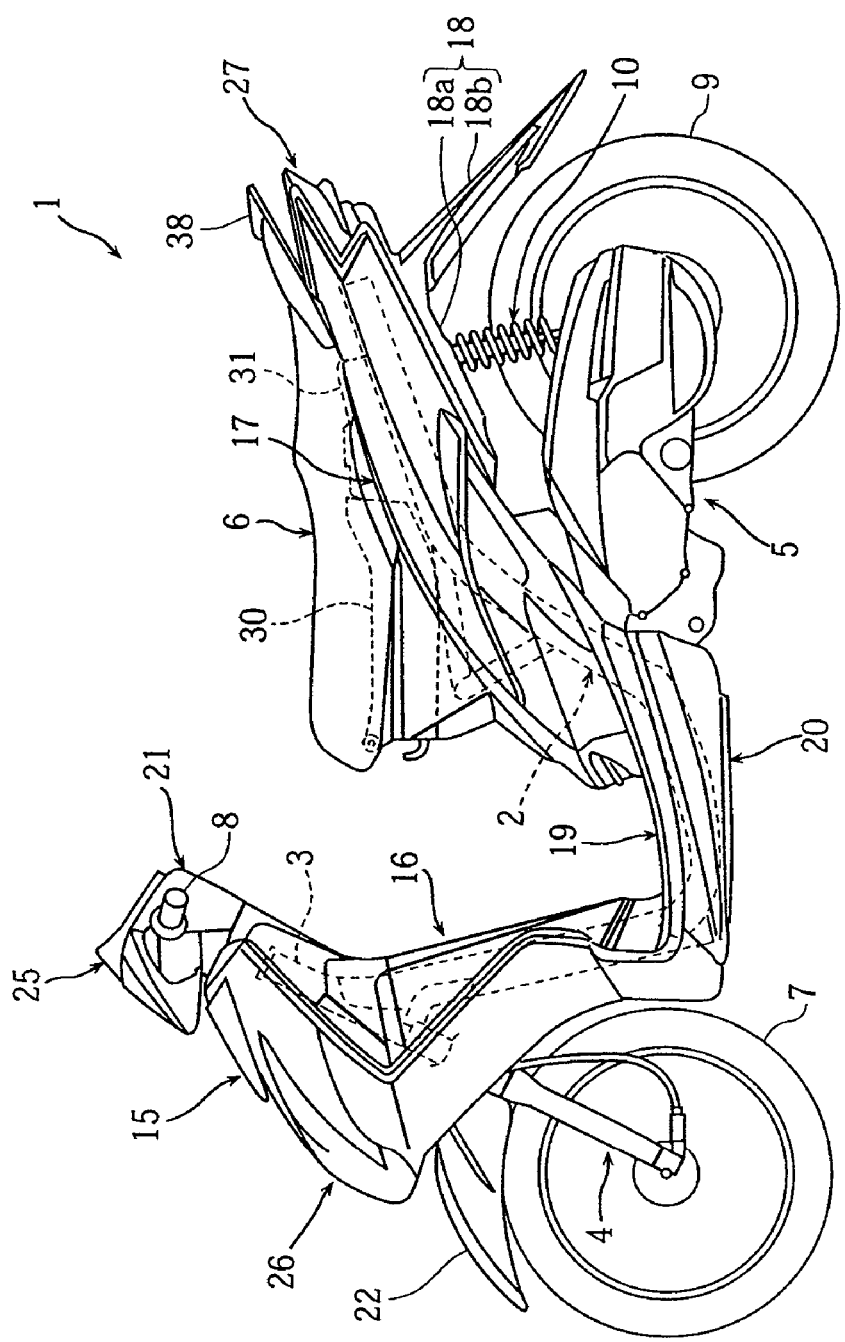
FIG. 1 is a side view of a motorcycle equipped with a tail lamp unit or light unit configured in accordance with a preferred embodiment of the present invention.

The following detailed description is now directed to certain specific embodiments of the invention. In this description, reference is made to the drawings wherein like parts are designated with like numerals throughout the description and the drawings.

An embodiment of a vehicle that has a light unit according to the present invention will now be described. It should be understood that the disclosed embodiment is a preferred embodiment of the present invention and is not intended to limit the scope of the present invention.

FIGS. 1 through 8 illustrate a scooter-type motorcycle 1 equipped with a tail lamp unit or light unit 27 according to a preferred embodiment of the present invention. The terms front, rear, left, and right are taken from the point of view of a rider sitting on the seat of the motorcycle 1. Although the present light unit is illustrated in the context of a scooter-type motorcycle 1, the present invention can be used with other types of vehicles including, but not limited do, other types of motorcycles, snowmobiles, and ATVs.

The motorcycle 1 includes an under bone type body frame 2 and a head pipe 3 positioned at the front end of the body frame 2. The motorcycle 1 further includes a front fork 4 and a swing-type engine unit 5. The front fork 4 is pivotably supported by the head pipe 3 and is capable of being steered left and right. The engine unit 5 is pivotably supported by the body frame 2 and can swing up and down. Mounted above the engine unit 5 on the body frame 2A is a straddle-type seat 6. The seat 6 may accommodate up to two riders.

The front lower end of the front fork 4 supports a front wheel 7. A steering handle 8 is fixed to an upper rear end of the front fork 4. A front fender 22 covers the upper side of the front wheel 7. A rear wheel 9 is rotatably supported by a rear end section of the engine unit 5. A shock absorber 10 is disposed between the engine unit 5 and the body frame 2.

A storage box 30 and a fuel tank 31 are respectively positioned beneath the seat 6. The storage box 30 may be positioned in front of the fuel tank 31. The storage box 30 may support the front end of the seat 6 so as to allow the seat 6 to rotate in an upward direction to access the storage box 30.

The motorcycle 1 may include a grab bar 38 at the rear edge of the seat 6. The grab bar 38 is attached and fixed to the body frame 2 beneath the seat 6. The grab bar 38 can be held by a rear rider.

A handle cover 21 covers the periphery of the steering handle 8. The handle cover 21 may include a meter unit 25. The meter unit 25 may include a speedometer, a fuel level meter, etc. The front side of the head pipe 3 is covered by a front cover 15. The front cover 15 may include a headlight unit 26. The rear side may be covered by a leg shield 16.

Figure 2:
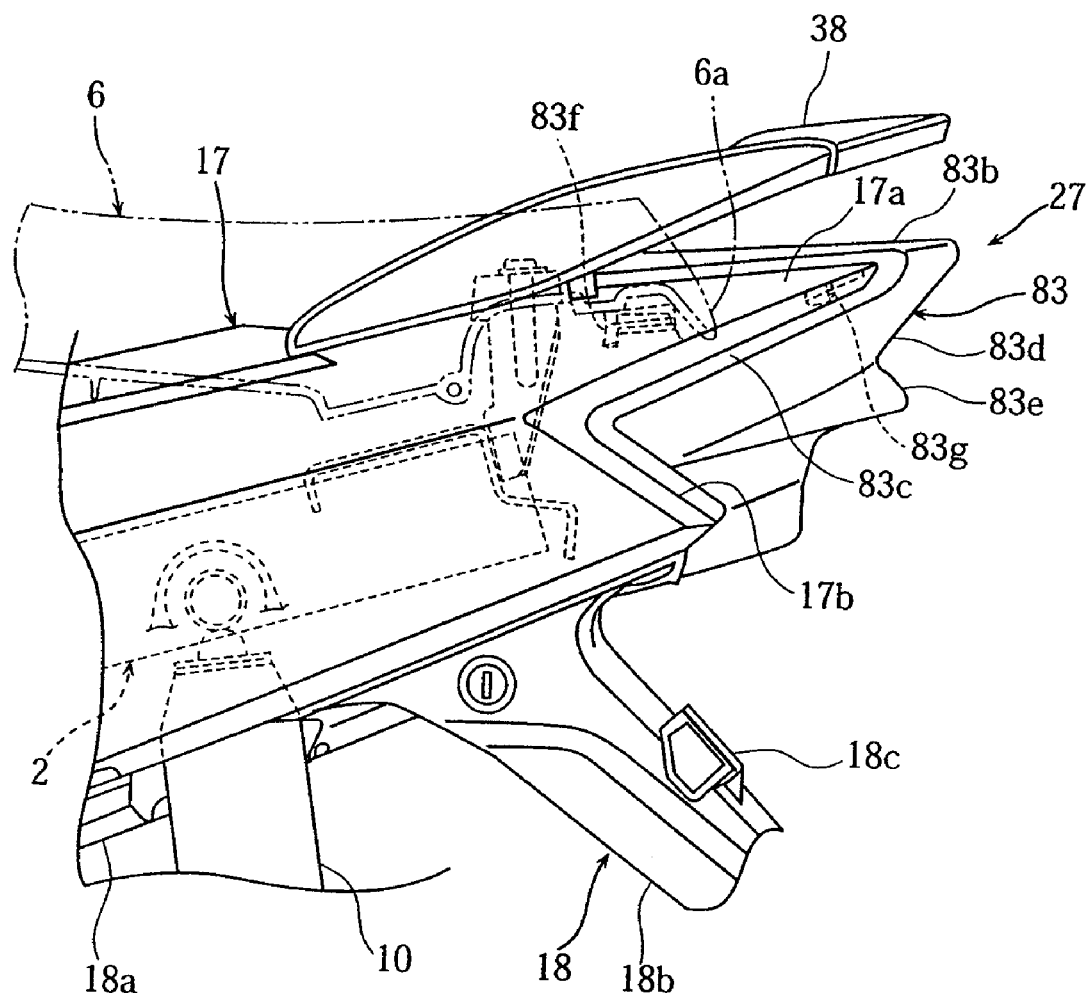
FIG. 2 is an enlarged partially side view of a rear portion of the motorcycle from FIG. 1 showing the light unit.

FIG. 2 is an enlarged partial side view of a rear portion of the motorcycle 1 from FIG. 1. Referring to both FIGS. 1 and 2, the lower side periphery of the seat 6 is covered by the left and right side covers 17, 17. The rider's feat may rest on a footboard 19 between the leg shield 16 and left and right side covers 17, 17. An under cover 20 may cover the lower side of the footboard 19.

A rear fender 18 covers the rear wheel 9. The rear fender 18 may include a front section 18a that covers the front of the rear wheel 9 and a rear section 18b that covers the rear of the rear wheel 9. License plate attachment members 18c, 18c are formed on a rear surface of the rear fender section 18b.

The motorcycle 12 further includes a tail lamp unit or light unit 27. In the illustrated embodiment, the light unit 27 is located near the rear end section of the left and the right side covers 17, 17. The light unit 27 preferably attaches to a rear end section of the body frame 2.

Figure 3:
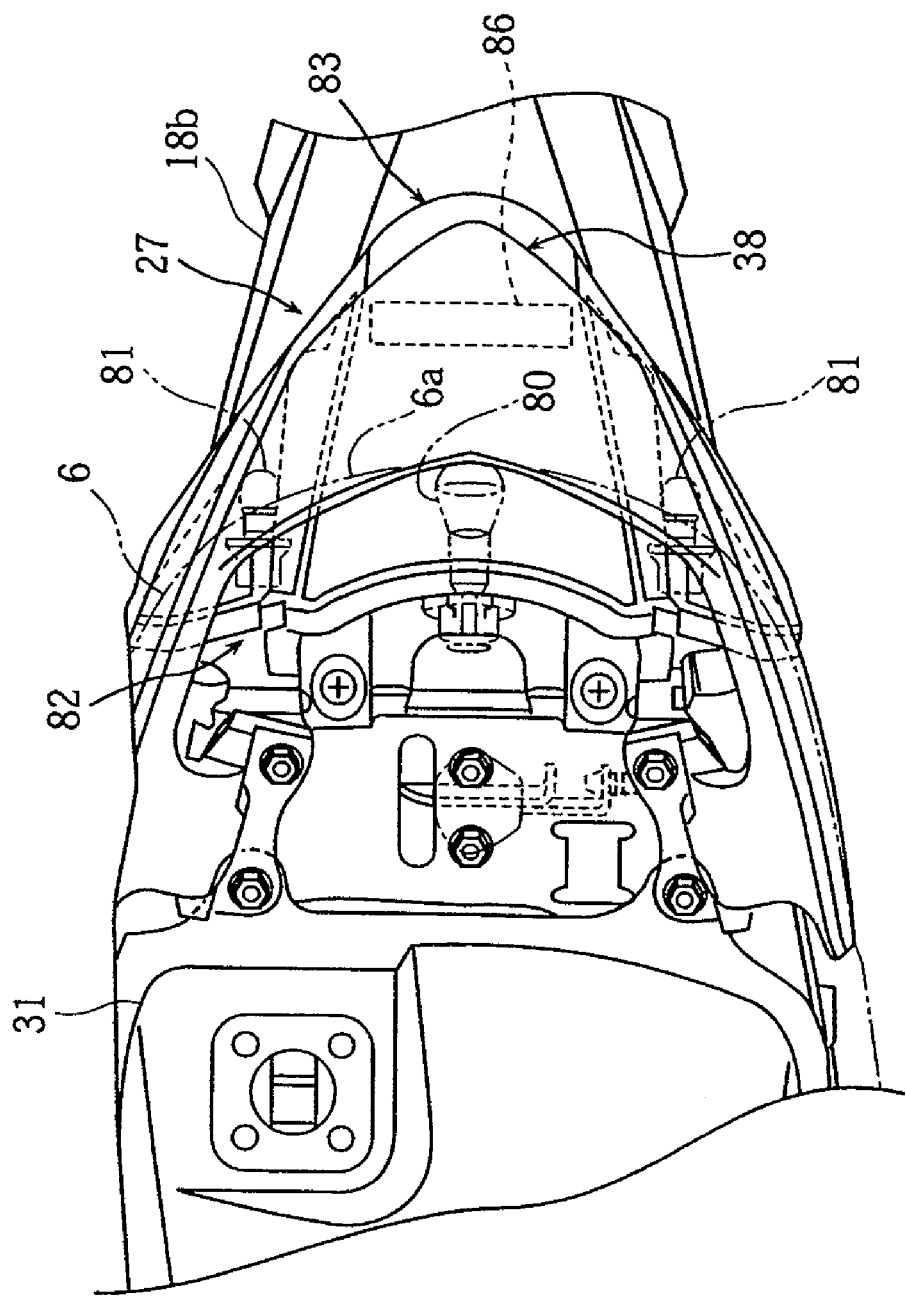
FIG. 3 is a plan view of the rear portion of the motorcycle from FIG. 2.

FIG. 3 is a plan view of the rear portion of the motorcycle 1 from FIG. 1. The light unit 27 is preferably located near the middle of the vehicle in a width direction. The light unit 27 may include one or more bulbs. For example, the illustrated light unit 27 includes a tail lamp bulb 80, flasher bulbs 81, 81, a lamp body 82, and an outer lens 83. The tail lamp bulb 80 lights when the rider operates the brakes. The flasher bulbs 81, 81 are positioned to the left and right sides of the tail lamp bulb 80 and flash when the rider operates a switch. The lamp body 82 preferably detachably holds each flasher bulb 81 and the tail lamp bulb 80. The outer lens 83 is made of a transparent resin or the like and is preferably shared by all of the bulbs 80, 81. The outer lens 83 is positioned so as to cover a lens opening 82a of the lamp body 82 (see FIGS. 7 and 8).

Figure 4:
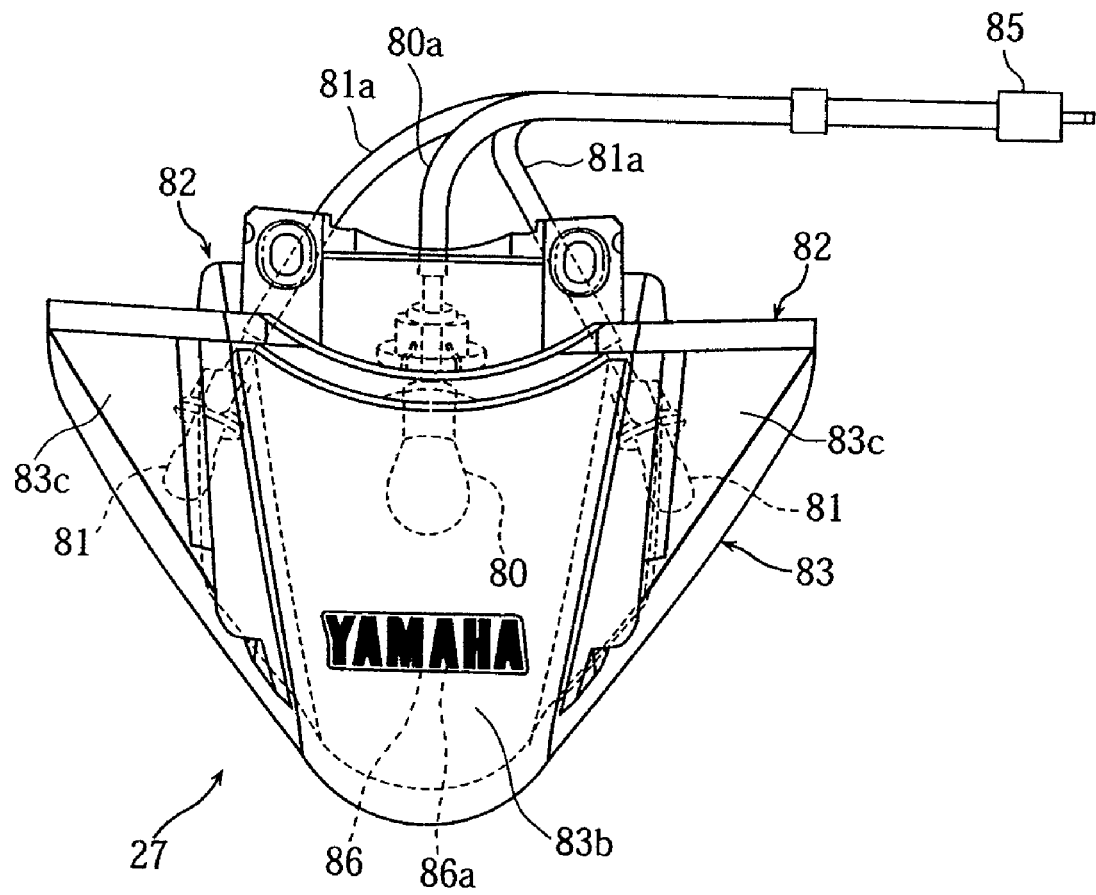
FIG. 4 is a plan view of the light unit from FIG. 3 removed from the motorcycle.

FIG. 4 is a plan view of the light unit 27 from FIG. 3 removed from the motorcycle 1. Power cords 80a, 81a, 81a are respectively connected to the tail lamp bulb 80, and the left and right flasher bulbs 81. Each power cord 80a, 81a is connected via a connector 85 to a power source, such as a battery.

Figure 5:
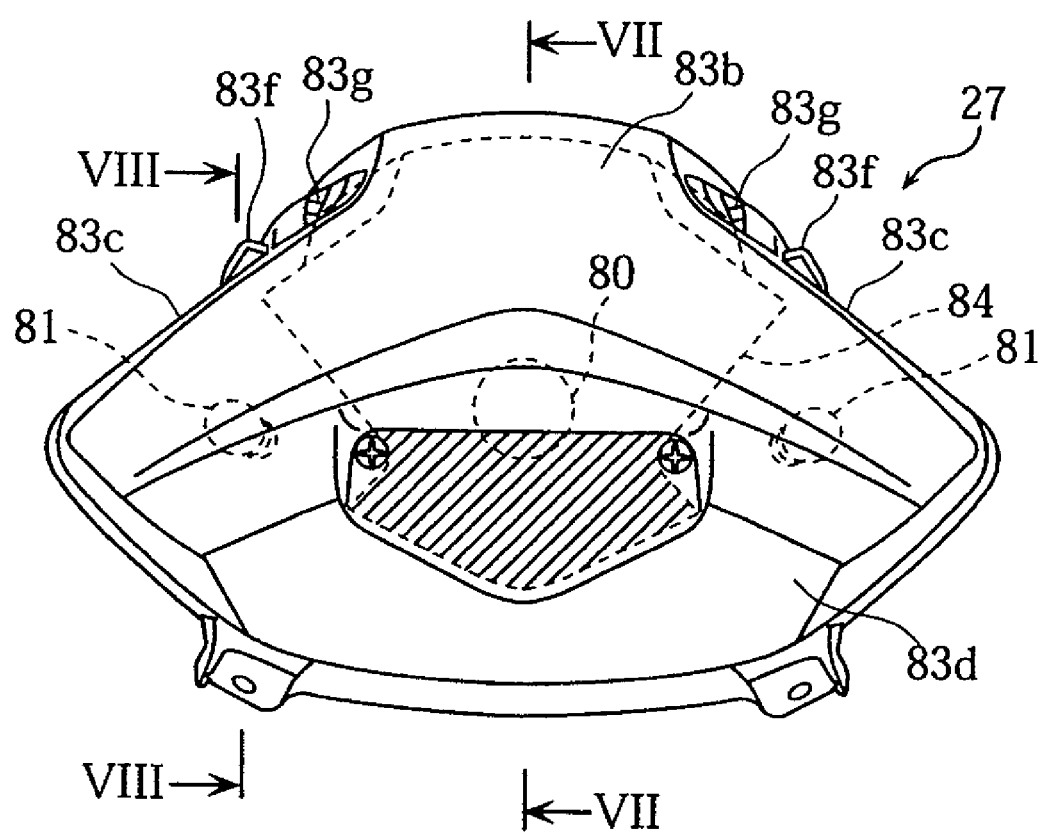
FIG. 5 is a rear view of the light unit from FIG. 4.
Figure 6:
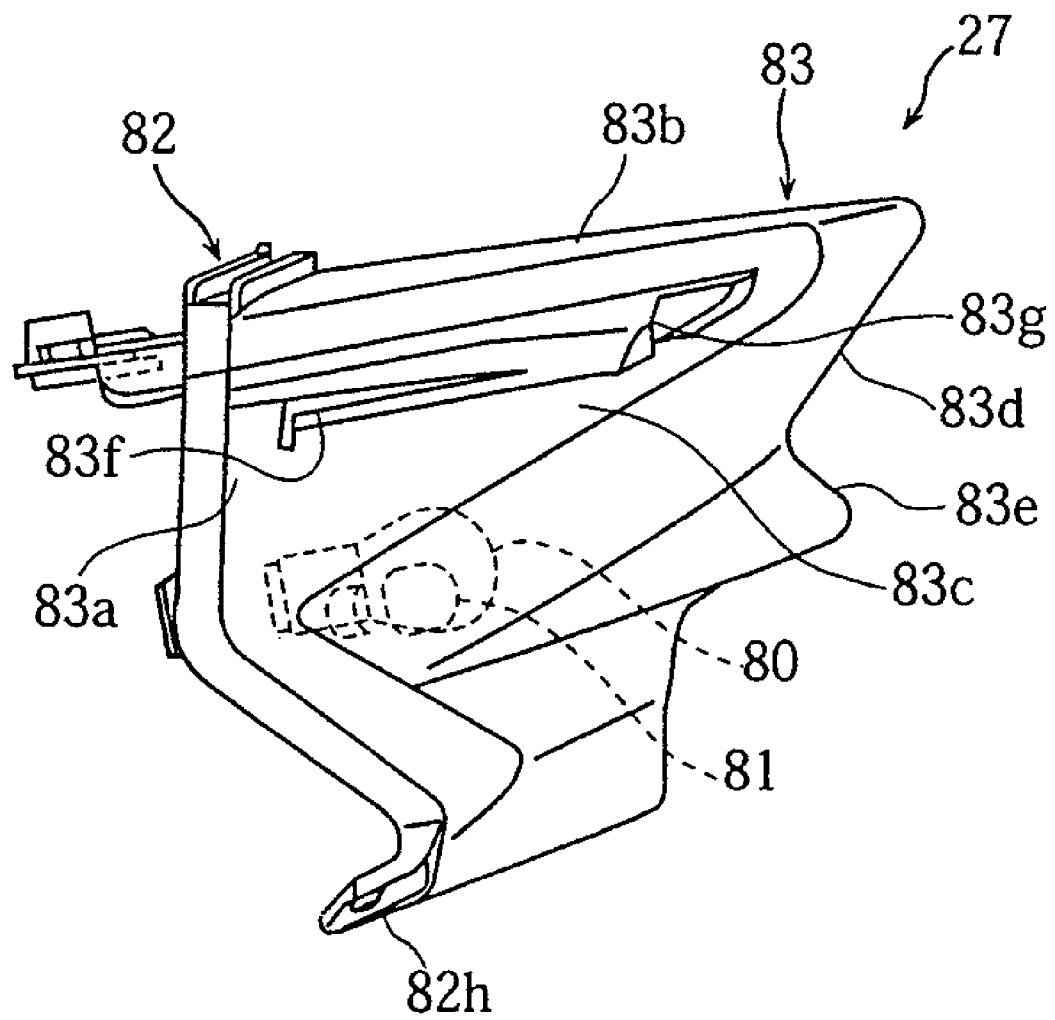
FIG. 6 is a side view of the light unit from FIG. 4.
Figure 7:
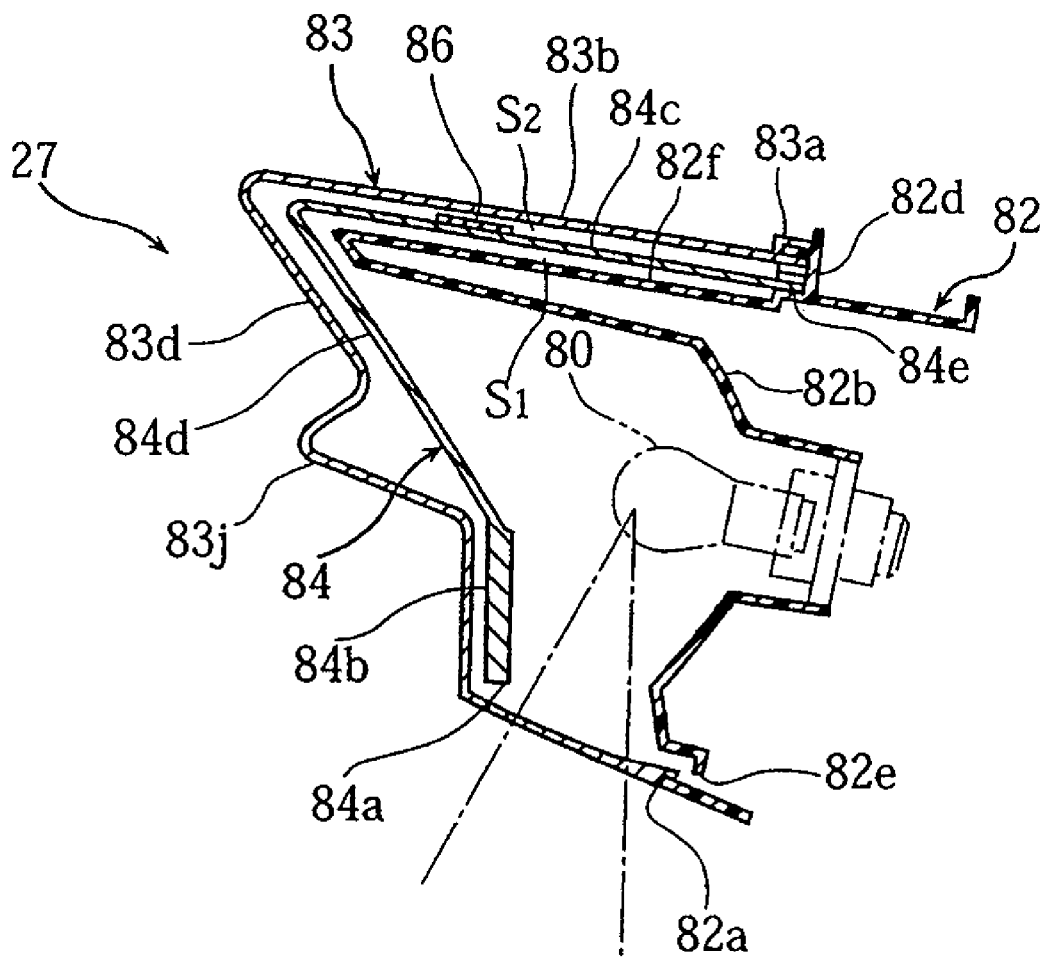
FIG. 7 is a cross sectional side view of the light unit taken along line VII-VII in FIG. 5.

FIG. 5 is a rear view of the light unit 27 from FIG. 4. FIG. 6 is a side view of the light unit 27 from FIG. 4. FIG. 7 is a cross sectional side view of the light unit 27 taken along line VII-VII in FIG. 5. As is illustrated in FIG. 7, the lamp body 82 includes a center reflector 82b. The center reflector 82b preferably has a bowl-like shape and receives the tail lamp bulb 80.

Figure 8:
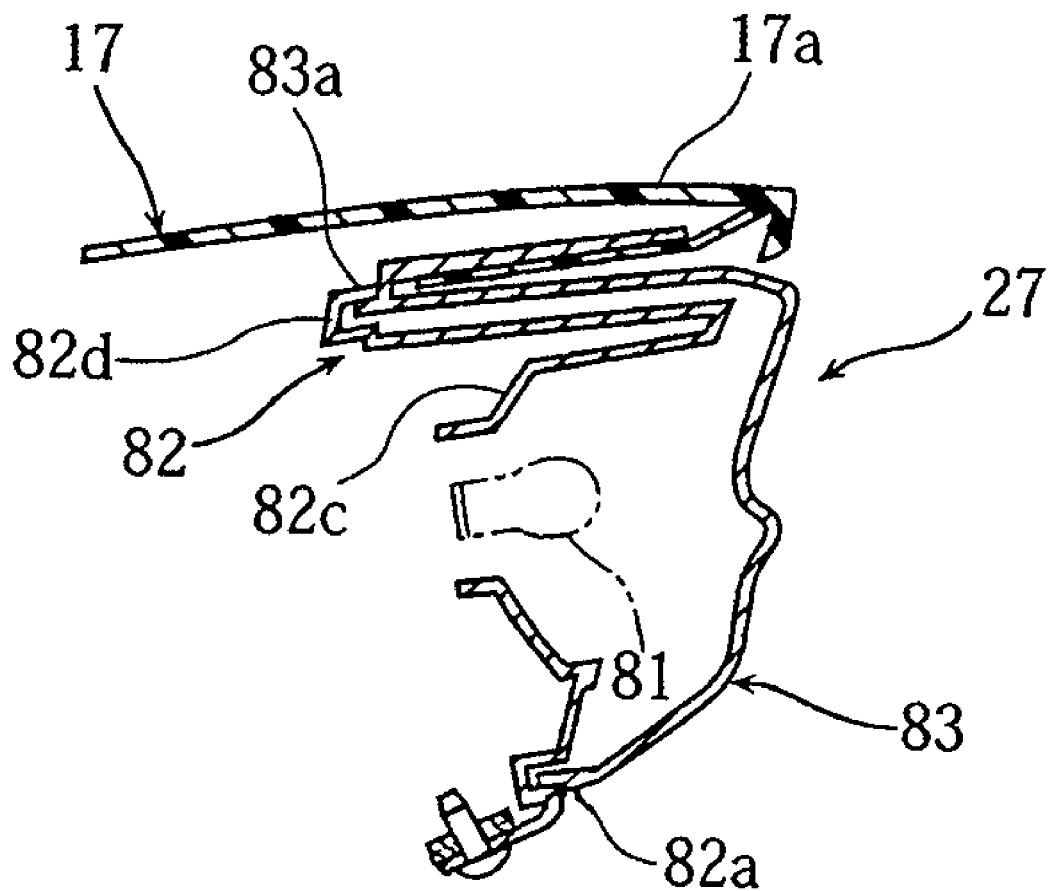
FIG. 8 is a cross sectional side view of the light unit taken along line VIII-VIII in FIG. 5.

FIG. 8 is a cross sectional side view of the light unit 27 taken along line VIII-VIII in FIG. 5. As is illustrated in FIG. 8, the lamp body 82 further includes left and right reflectors 82c. The left and right reflectors 82c preferably have bowl-like shapes and receive the left and right flasher bulbs 81, 81, respectively. An inner surface of each reflector 82b, 82c includes a reflecting surface. The reflecting surfaces may be formed by, for example, vapor-depositing aluminum. The reflecting surfaces reflect light from the bulbs 80, 81 towards the outer lens 83.

The lamp body 82 includes an engagement groove 82d formed around the outer circumference of the lens opening 82a. The engagement groove 82d engages with the outer edge 83a of the outer lens 83, preferably in a water-tight manner. The center reflector 82b of the lamp body 82 may include a lower drain hole 82e.

As most clearly shown in FIGS. 5 and 7, the light unit 27 further includes an inner lens 84. The lens 84 fits over an opening in the center reflector 82b. The inner lens may be made from resin or other material. The inner lens 84 is preferably colored red. As most clearly illustrated in FIG. 7, the inner lens 84 has a transparent section 84d that covers the opening of the center reflector 82b. An upper side wall 84c of the inner lens 84 extends between a rear upper edge of the transparent section 84d and the engagement groove 82d. The front edge 84e of the upper side wall 84c engages with the engagement groove 82d.

A notch 84a may be formed in a lower portion of the inner lens 84. The notch 84a allows light from the tail lamp bulb 80 to directly luminate a license plate without passing through the inner lens 84. A shielding member 84b inhibits the light emitted by the tail lamp bulb 80 from exiting the inner lens 84 in a rearward direction so as to make it difficult for someone looking at the rear of the motorcycle 1 to see the tail lamp bulb 80.

The outer lens 83 preferably surrounds the outside of each reflector 82b, 82c and engages with the engagement groove 82d of the lamp body 82. The outer lens 83 generally protrudes in a rearward direction from the left and right side covers 17, 17.

As shown most clearly in FIGS. 5 and 7, the outer lens 83 includes an upper wall section 83b, left and right side wall sections 83c, 83c, and a rear wall section 83d. The upper wall section 83b has a generally flat shape and extends across the motorcycle 1 and between the rear most sections 17a, 17a of the left and right side covers 17, 17. As shown most clearly in FIG. 4, the left and right side wall sections 83c, 83c have a generally sideways V-shape when viewed from the side and extend downward in a step-like manner from the left and right side edges of the upper wall section 83b. As shown most clearly in FIG. 5, the rear wall section 83d has a curved shape and connects to the left and right side wall sections 83c, 83c and the upper wall section 83b. The upper wall section 83b is positioned on the rear side of the seat 6.

As shown most clearly in FIG. 2, a front edge section of the upper side wall section 83b is inserted beneath the seat 6 and forward of a rear edge 6a of the seat 6. In addition, the rear wall section 83d includes a rearwardly protruding section 83e that improves the external appearance of the outer lens 83.

Notches 17b are formed in the rear end sections 17a of the left and right side covers 17. The notches 17b may have a generally sideways V-shape and generally extend along the left and right side wall sections 83c, 83c of the outer lens 83. When the vehicle is viewed from the side, rear sections of the left and right side wall sections 83c, 83c are visible through the notches 17b. Accordingly, it is possible to see flashing light being emitted by the flasher bulbs 81 after the light passes through the rear wall section 83d.

The outer lens 83 includes front side and rear side engagement members 83f, 83g. The front side and rear side engagement members 83f, 83g engage with the rear end sections 17a of the left and right side covers 17. The front side and the rear side engagement members 83f, 83g cover the rear end sections 17a.

As shown most clearly in FIG. 7, the light unit 27 further includes a shadow-forming wall section 82f. At least a portion of the shadow-forming wall section 82f comprises an opaque material. The shadow-forming wall section 82f is preferably integral with the lamp body 82. The shadow-forming wall section 82f may be disposed above each reflector 82b, 82c and extends toward the front of the motorcycle 1 and around the rear edge of each reflector 82b, 82c. The shadow-forming wall section 82f preferably is at least generally parallel to the upper wall section 83b of the outer lens 83 and the upper side wall 84c of the inner lens 84. The engagement groove 82d is preferably an integral part of the forward end of the shadow-forming wall section 82f.

In the illustrated embodiment, light emitted by the tail lamp bulb 80 is reflected in a rearward direction by the reflector 82b. However, a portion of the light reaches the bottom of a seal 86 through a gap between the rear end of the reflector 82b and the inner lens 84 and then through gap S1. Most of the light from the tail lamp bulb 80 is shielded by the reflectors 82b, 82c and thus does not directly reach the shadow-forming wall section 82f.

The upper side wall 84c of the inner lens 84 preferably is generally parallel with the shadow-forming wall section 82f and is spaced from the shadow-forming wall section 82f by the distance or gap S1. The upper side wall 84c also is preferably at least generally parallel to the upper wall section 83b of the outer lens 83 and is spaced from the upper wall section 83b by a distance or gap S2. The gaps S1, S2 preferably are the same size. The lengths of the shadow-forming wall section 82f, the upper side wall 84c, and the upper wall section 83b of the outer lens 83 are also preferably the same size.

As shown most clearly in the embodiment shown in FIGS. 4 and 7, the seal 86 is attached to the top surface of the upper side wall 84c of the inner lens 84. The seal 86, however, can alternatively be supported or suspended above the shadow-forming wall section 82f by other structure within the outer lens 83 or be disposed on an inner surface of the inner lens 84 or disposed within the inner lens 84 (e.g., embedded therein).

In a preferred form, the seal 86 is made of a light permeable thin film and includes a shadow casting design 86a. The design 86a, such as for example a logo mark, is printed on the seal 86. In this way, someone viewing the motorcycle 1 can see the seal 86 though the outer lens 83. The design 86a inhibits outside light from passing through the design 86a. The design 86a thus casts a shadow on the upper surface of the shadow-forming wall section 82f.

The gap S1 is defined between the inner lens 84 on which the seal 86 is attached and the shadow-forming wall section 82f. Accordingly, the shadow is formed at a distance equivalent to the gap S1 below the design 86a. As a result, the shadow gives a viewer the impression that the design 86a is a three-dimensional object that is floating upwards.

In the illustrated embodiment, the shadow-forming wall section 82f is formed integrally with the lamp body 82, thereby reducing the need for additional parts. Alternatively, one or more of the light unit 27 parts could be separately made and subsequently assembled without departing form the scope of the invention.

The reflectors 82b, 82c of the lamp body 82 are preferably positioned between the tail lamp bulb 80 and the shadow-forming wall section 82f. With this arrangement, the reflectors 82b, 82c inhibit light from the tail lamp bulb 80 reaching the shadow-forming wall section 82f which enhances the floating effect of the shadow casting design 86a. If enough light from the tail lamp bulb 80 reaches the shadow-forming wall section 82f, the light may cancel the outside light and reduce the contrast of the shadow on the shadow-forming surface.

In the illustrated embodiment, the shadow-forming wall section 82f is generally parallel with the upper side wall 84c of the inner lens 84. Advantageously, this arrangement enhances the distinctiveness of the shadow.

With the seal 86 attached to the upper surface of the inner lens 84, the seal 86 is easily visible through the outer lens 83. Furthermore, since the outer lens 83 blocks ultraviolet rays, the seal 86 lasts longer than if the seal 86 were exposed to ultraviolet rays.

Figure 7A:
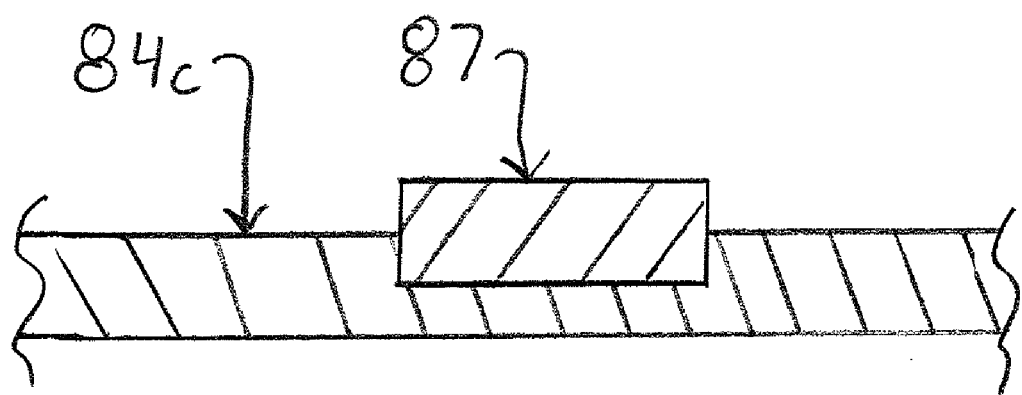
FIG. 7A is a schematic cross-sectional view of the light, similar to that of FIG. 7, illustrating a texture pattern placed on the lens.

In the above-described embodiment, the shadow casting design 86a is formed by a seal 86 made from light permeable thin film. However, the shadow casting design of the invention may alternatively be formed by, for example, a texture pattern 87 placed on the upper side wall of the inner lens (schematically illustrated in FIG. 7A). Additionally, either or both of the inner and outer lens 83, 84 may have some, negligible or no optical powers and may or may not otherwise alter one or more characteristics of light (for example, but not limited to, filtering certain wavelengths of light).

In the above-described embodiment, the seal 86 is stuck to the top surface of the upper side wall 84c of the inner lens 84. Alternatively, the seal 86 may be attached to the bottom surface of the upper side wall 84c of the inner lens, or may be embedded within the inner lens. Furthermore, the shadow of the invention may be formed on another surface of the light unit 27, such as the outer or inner surfaces of the outer lens 83.

In the above-described embodiment, the gap S1 is between the bottom surface of the inner lens 84 and the shadow-forming wall section 82f. However, the gap S1 may be formed between the shadow casting design 86a and the shadow-forming surface. Thus, for example, the shadow casting design 86a may be located on a top surface of a light permeable lens while the bottom surface of the same lens may be used for the shadow-forming surface. In such an embodiment, the thickness of the lens constitutes the above-described gap.

As noted previously, the light unit 27 described above may be used with a variety of vehicles including a motorcycle, scooter, bicycle, automobile, or other vehicle on land, on water, or in the air.

In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A light unit for a vehicle comprising:
   a bulb;
   an outer lens;
   an inner lens, at least a portion of the inner lens being disposed inside the outer lens;
   an opaque member disposed inside the outer lens; and
   a shadow casting member disposed on the inner lens and positioned between the outer lens and the opaque member, at least a portion of the shadow casting member being spaced from at least a portion of the opaque member so that at least some outside light entering the outer lens casts a shadow on the opaque member;
   wherein at least a portion of the opaque member is positioned directly between the bulb and at least a portion of the shadow casting member.

2. The light unit according to claim 1, wherein at least a portion of the opaque member lies generally parallel with at least a portion of the shadow casting member.

3. The light unit according to claim 1, wherein at least a portion of the shadow casting member is disposed in the inner lens.

4. The light unit according to claim 1, wherein a first gap exists between the outer and inner lenses and a second gap exists between the inner lens and the opaque member, and the first and second gaps are at least generally equal.

5. A light unit for a vehicle comprising:
   a bulb;
   a lens at least partially made of a translucent material an outer lens disposed outside the lens;
   a shadow-forming surface disposed inside the lens and including at least a portion made of an opaque material; and
   a shadow casting design disposed on the lens and spaced from the shadow-forming surface so that outside light entering through the lens casts a shadow on the shadow-forming surface, wherein the portion of the shadow-forming surface made from an opaque material being disposed directly between the bulb and the shadow casting design.

6. The light unit according to claim 1 further comprising a lamp body for receiving the bulb, the shadow-forming surface being part of the lamp body.

7. The light unit according to claim 6, wherein the lamp body is opaque and is positioned between the bulb and the shadow casting design.

8. The light unit according to claim 1, wherein the shadow-forming surface lies generally parallel with at least a portion of the shadow casting design.

9. The light unit according to claim 1, wherein the shadow casting design comprises a texture pattern.

10. The light unit according to claim 1, wherein the shadow casting design comprises a seal having a design attached thereto, the seal being made from a light permeable film.

11. The light unit according to claim 10, wherein the seal is disposed on an outer surface of the lens.

12. The light unit according to claim 10, wherein the seal is disposed on an inner surface of the lens.

13. The light unit according to claim 10, wherein at least a portion of the seal is disposed inside the lens.

14. A vehicle comprising:
    a frame supported by two wheels; and
    a light unit having:
       a bulb;
       a lens at least partially made of a translucent material;
       a shadow-forming surface disposed inside the lens and being at least partially made of an opaque material the shadow-forming surface being disposed directly between the bulb and the lens; and
       a shadow casting design disposed on an inner lens and positioned between the lens and the shadow-forming surface and being spaced from the shadow-forming surface so that outside light entering through the lens casts a shadow on the shadow-forming surface.

15. The motorcycle according to claim 14 further comprising a lamp body for receiving the bulb, the shadow-forming surface being part of the lamp body.

16. The motorcycle according to claim 14, wherein the shadow-forming surface lies generally parallel with at least a portion of the shadow casting design.

17. The motorcycle according to claim 14, wherein the shadow casting design comprises a seal having a design attached thereto, the seal being made from a light permeable film, and the seal is attached to a surface of the lens.

18. A light unit for a vehicle comprising:
    an outer lens;
    an inner lens, at least a portion of the inner lens being disposed inside the outer lens;
    an opaque member disposed inside the outer lens; and
    a shadow casting member disposed on the inner lens and positioned between the outer lens and the opaque member, at least a portion of the shadow casting member being spaced from at least a portion of the opaque member so that at least some outside light entering the outer lens casts a shadow on the opaque member;
    wherein the shadow casting member is sufficiently spaced from the opaque member to create an illusion of a three-dimensional object floating within the outer lens, the opaque member is disposed directly between a bulb and the outer lens.

* * * * *